E. H. SMITH, Jr.
SIGNALING DEVICE FOR AUTOMOBILES AND THE LIKE.
APPLICATION FILED AUG. 1, 1913.
1,177,658.
Patented Apr. 4, 1916.
2 SHEETS—SHEET 1.
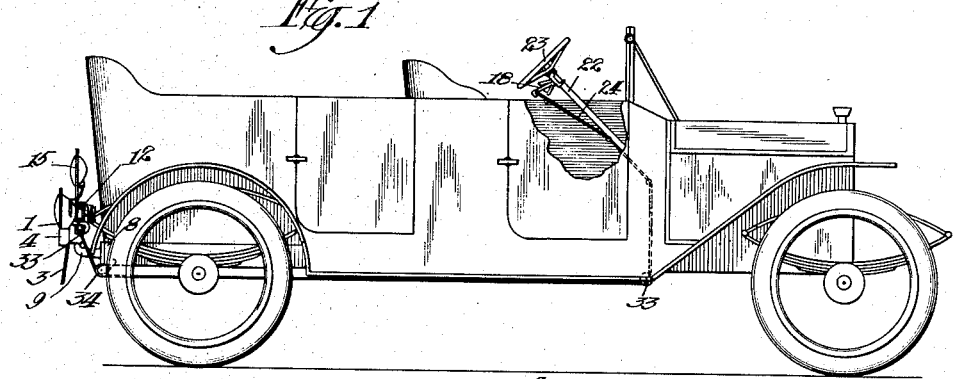
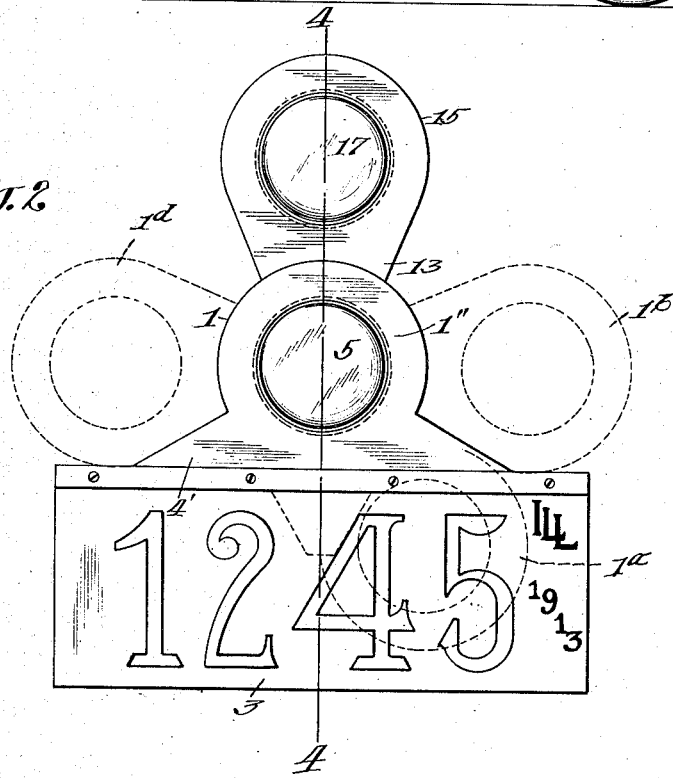
Witnesses:
Inventor:
Emory H. Smith Jr.

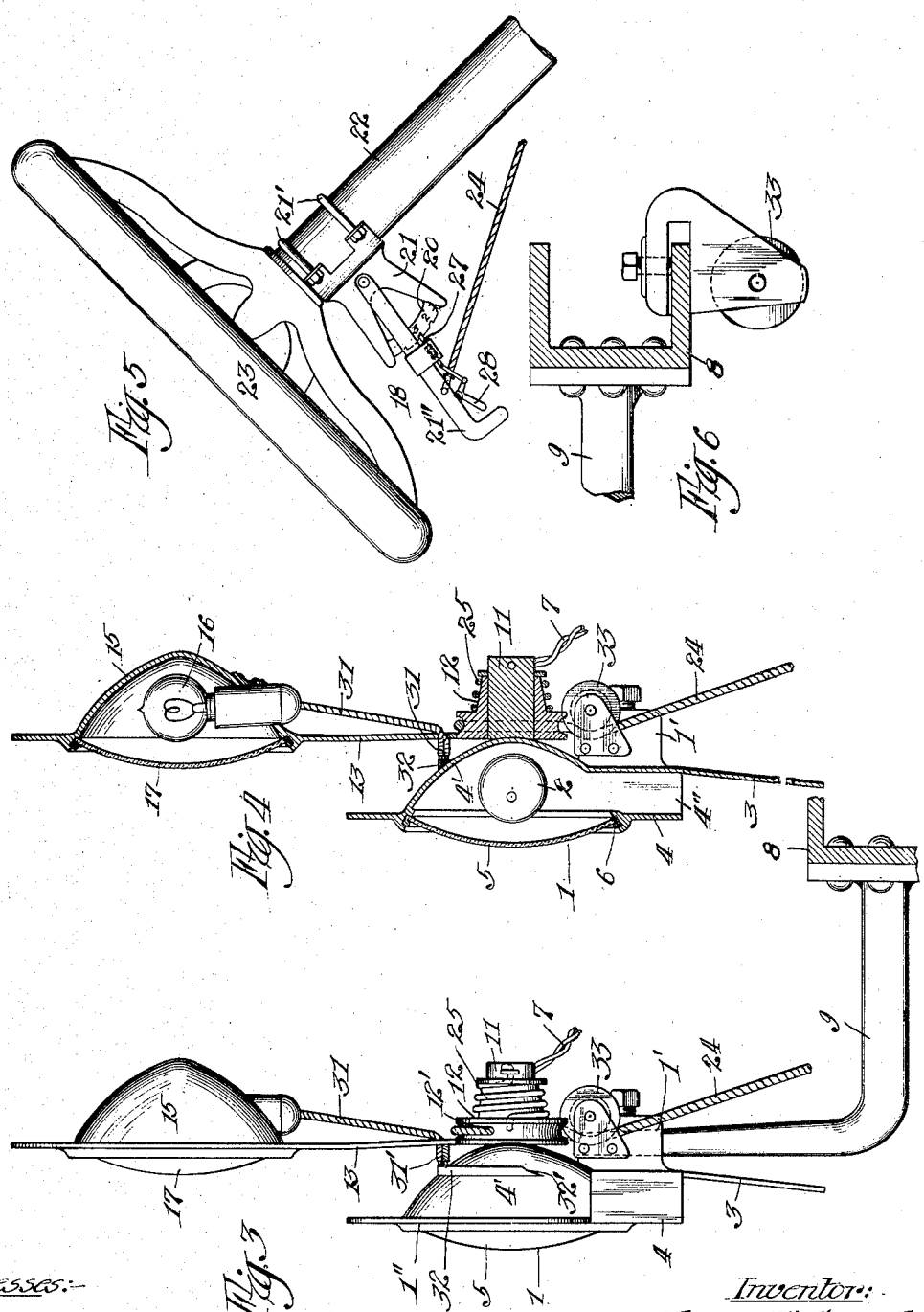

UNITED STATES PATENT OFFICE.

EMORY H. SMITH, JR., OF CHICAGO, ILLINOIS.

SIGNALING DEVICE FOR AUTOMOBILES AND THE LIKE.

1,177,658.     Specification of Letters Patent.     Patented Apr. 4, 1916.

Application filed August 1, 1913. Serial No. 782,524.

*To all whom it may concern:*

Be it known that I, EMORY H. SMITH, Jr., a citizen of the United States, and a resident of Chicago, county of Cook, and State of Illinois, have invented certain new and useful improvements in Signaling Devices for Automobiles and the like, of which the following is a specification.

The primary object of my invention is to provide a signaling device for automobiles and the like, wherewith the intentions of the driver of the automobile may be communicated to the driver of a following car in time to allow him to act in accordance with the signal displayed.

Another object of my invention is to provide a signaling device for automobiles and the like which may be constructed cheaply, which will also serve the functions of the usual tail light, and which can be easily attached to the car and conveniently operated by the driver without taking his hand from the steering wheel.

My invention consists generally in a signaling device for automobiles and the like, comprising a stationary tail light and a swingable signal coöperable therewith, and means for swinging the signal into different angular positions relative to the tail light.

My invention consists further in a signaling device comprising a tail light formed and adapted for attachment to a stationary member, a signal member pivotally mounted on the tail light and mechanism arranged adjacent to the steering wheel for swinging the signal member into different angular positions relative to the tail light, and means for holding the signal light in the different angular positions.

My invention consists still further in the unique construction, arrangement, and coöperation of the parts whereby those objects named above, and others which will appear hereinafter are attainable.

My invention will be more readily understood by reference to the accompanying drawings, and in which:

Figure 1 is a side elevation of an automobile equipped with a signaling device embodying my invention; Fig. 2 is a veiw showing the signal in what I term the stop indicating position, the dotted lines indicating other positions; Fig. 3 is an enlarged side elevation of the signal with the parts in the position shown in Fig. 2; Fig. 4 is an enlarged vertical section substantially on the line 4—4 of Fig. 2; Fig. 5 is an enlarged view showing the automobile steering post and wheel with the signal operating lever arranged thereon; and Fig. 6 is a detail view showing a pulley clamped to the automobile frame for guiding the signal operating cord.

I am aware that I am not the first to invent a signal device for automobiles and the like. The signaling devices hitherto devised, however, are defective in a number of ways, which makes them commercially impracticable. For instance, some of the devices hitherto devised are very complicated and hence expensive both to manufacture and maintain. Others are not conveniently operable, so that it is practically impossible for the driver of an automobile to operate the signal along with the many other controlling devices of the modern automobile. Then in some of the signals hitherto devised the signal is arranged for automatic operation from the brake or clutch lever, but signals of this construction are of little use because they do not give the following driver sufficient warning.

I shall now describe in detail my unique device whereby those defects enumerated and others are overcome.

1 indicates a lamp corresponding in some respects to the tail light now in use, and to facilitate description shall term it a tail light. The tail light is adapted to be fixed to the frame of the automobile, and for this purpose I provide it with a socketed lug 1' for placement upon an arm or bracket 9, which is secured to the frame 8 or some other suitable part of the automobile. The tail lamp 1 has a substantially circular face 1" and an extended lower portion 4. A lens 5 is secured in the face 1" by any suitable means, such as a split ring 6, and the back 4' is preferably curved out, as shown, to accommodate the lamp 2. The license number 3 may be conveniently attached to the back portion of the lamp and is lighted from the lamp by means of the opening 4" in the bottom of the lamp casing. The lens 5 may be of any desired color, but it is preferably a red, the same as other tail lights. Practically every city and town has an ordinance requiring a tail light, so that a lamp of this or other construction furnishes part of the equipment of every automobile. The tail light alone, while it serves to inform the driver of the car following that there is a vehicle ahead, does not in any way indicate to the following driver the intentions of driver of the forward car. The first warning to the following driver is given when the forward car starts to turn which oftentimes is too late to permit him to alter his course or to stop his car. This is peculiarly so in large cities where the cars follow one another very closely. I therefore provide other means for warning the following driver. This means comprises a swinging arm 13 which carries a lamp frame 15 at its outer end in which a lens 17 and a lamp 16 are held. The member 13 is a arranged to swing around the tail light as a center and coöperate with the tail light to indicate the intentions of the driver. For convenience I shall term the arm 13 and the light and lens carried thereby a signal member. For instance, the vertical position of the signal member shown in full lines in the drawings indicates the stop position; that is, when the car is standing still or is about to stop, the signal member is thrown to a vertical position. Hence I term this the "stop indicating position." If the driver is to turn at the right, the signal member is thrown to the left, as indicated by dotted lines 1$^d$, and if the driver is to turn to the left the signal member is thrown to the right, as indicated by dotted lines 1$^b$. The lens of the lamp 15 carried by the signal member is green and in this manner red and green lights are displayed, the meaning of which will be familiar to most people because of their use for other purposes. When the automobile is simply moving forward and the driver does not contemplate a change, the signal member is moved into position behind the license number, as indicated at 1$^a$, in which event the tail light only may be seen.

In order that my signaling device will be as effective in the day time as night, I paint the face 1" of the tail light 1 red, and the signal member green. In this manner the relative positions of the parts may be readily distinguished in the daytime.

I prefer to mount the signal member 13 on the tail lamp so that the parts will constitute a single unitary device and for this purpose I fasten a stud or shaft 11 to the rear portion 4' of the tail lamp. On this I rotatably mount a drum 12 to which the signal arm 13 is affixed. Hence any movement of the drum 12 swings the signal member 13.

As before stated, in order that a device of this character be useful, it must be easily operable by the driver, and for this purpose I arrange an operating device 18 on the steering post 22 of the vehicle, and I preferably mount the signal operating device 18 close to the steering wheel 23, so that the driver can operate the signal without taking his hands from the steering wheel. The signal operating device 18, as here shown, comprises a casting 21 which may be affixed in any desired position on the steering post 22 by clamps 21'. Upon the casting 21 I pivotally mount an arm 21" and to this I affix the signal operating cord 24, which is suitably guided along the steering post 22 and to the rear of the car by means of pulleys 33 and 34. The other end of the cord is affixed to the drum 12 and 12'. It is obvious that movement of the lever 18 will rotate the drum 12 and therefore swing the signal member 13.

Since under many conditions only the tail light will be used, I provide means for holding the signal member 13 in its lowermost position indicated by the dotted lines 1$^a$. A coiled spring 25, arranged on the drum 12, having one end affixed thereto and the other to the stud 11 serves this purpose. The arm 21' of the signaling operating device is therefore pulled against the action of the spring 25 and will be returned to its lower position thereby. In order that the signal arm may be held in the definite positions indicated, I provide the castings 21 with a notched bar 20, having notches 1, 2, 3, and 4, indicating the four positions shown in the drawings, and to hold the arm in these notches I provide a spring latch 27 operable by means of the lever 28. The driver of the car can operate the lever 28 by simply placing his finger under it and pulling it upward. This can be easily done without releasing the hand from the steering wheel or in any way affecting the steering control, and therefore furnishes a very convenient method of operating the signal.

Since most of the automobiles are now equipped with electrical appliances, I prefer to provide both the tail light and the signal member with electric lamps, but I wish it to be understood that my invention is not limited to lamps of this type. Wires 7 extend from the source of electric supply to the tail lamp 2 and to the two circular contacts 32. The wires 31 have end portions 31' which engage the contacts 32 and supply current to the lamp 16. Since the lamp will not be needed when the signal is in its lowest position, I stop the contacts 32 at 32' so that the circuit is broken at that point, and I preferably bevel the extreme end portion 32' of the contacts to facilitate engagement.

It should be obvious from the detailed description that the objects and advantages outlined in the opening of the specification are attainable by the structure herein shown and described, but because this disclosure will suggest to others skilled in the art different modified forms I do not wish to be limited to the specific constructions shown and described, except as may be necessary by express limitations in the claims hereunto appended.

I claim:—

1. In a signaling device, the combination of a stationary lamp, a casing for said lamp, a plate depending therefrom said casing having an opening in its bottom to permit the light from the lamp to illuminate the plate, a lamp mounted on the stationary lamp and swingable concentrically around the same, means for holding the swingable lamp in different exposed angular positions to coöperate with the stationary lamp and means for moving the swingable lamp into position behind said depending plate.

2. In a signaling device, the combination of a stationary lamp, a casing for said lamp, said casing carrying a depending plate and having an opening in its bottom to permit light from the lamp to illuminate the plate, a lamp mounted on the stationary lamp and swingable concentrically around same, segmental circular contacts carried by one of the lamps and electric terminals carried by the other lamp, said terminals and circular contacts being engaged to light the swingable lamp, when it is in exposed positions and being disengaged when it is moved into position behind said depending plate.

3. In a signaling device, the combination of a stationary lamp, a casing for said lamp, a plate-like portion carried by the lamp, said casing having an opening to permit light from the lamp to illuminate the plate-like portion, a lamp mounted on the stationary lamp and swingable concentrically around the same, means for holding the swingable lamp in different exposed angular positions to coöperate with the stationary lamp, means for lighting the swingable lamp when in the exposed angular positions, means for moving the swingable lamp into position behind said plate-like portion, and means for automatically extinguishing the lamp when it is moved to hidden position.

4. In a day and night signaling device, the combination of a stationary lamp and casing, a removable plate-like member for attachment to said casing, said casing having an opening to permit the illumination of the plate by said lamp, a swingable lamp arranged for movement concentrically around the stationary lamp, means for holding the swingable lamp in different exposed angular positions to coöperate with the stationary lamp, and means for moving the swingable lamp into position behind that occupied by said removable plate.

In testimony whereof, I have hereunto set my hand, this 22d day of July, 1913, in the presence of two subscribing witnesses.

EMORY H. SMITH, Jr.

Witnesses:
ARTHUR W. NELSON,
JOHN R. LEFEVRE.